UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

COMPOSITION FOR COATING CEMENT.

1,112,059.     Specification of Letters Patent.     Patented Sept. 29, 1914.

No Drawing.     Application filed May 24, 1909. Serial No. 497,934.

*To all whom it may concern:*

Be it known that I, CARLETON ELLIS, a citizen of the United States, residing at Larchmont, in the county of Westchester and State of New York, have invented certain new and useful Improvements in Compositions for Coating Cement, of which the following is a specification.

This invention relates to compositions for coating cement; and it comprises a process of coating concrete wherein the free alkali of the surface of such concrete is preliminarily neutralized by and combined with an acid derived from a drying oil; and it also comprises a composition for this purpose containing free fatty acids derived from drying oils; all as more fully hereinafter set forth and as claimed.

Ordinary Portland cement contains a considerable quantity of free alkali in the form of lime, potash and soda. Other calcareous cements also have this alkaline nature. It is consequently difficult to paint surfaces of concrete or calcareous cement with ordinary oil paints for the reason that the free alkali present saponifies the glycerids of the oil vehicle used, at once destroying such oil vehicle and setting free glycerin. This glycerin being substantially insoluble in the oil remains in the coating as such, making it porous and hydroscopic. Such oil paints therefore do not adhere well nor do they remain on the painted surface for an indefinite length of time without scaling and cracking off.

In order to overcome the difficulties attendant on the painting of concrete surfaces, various preliminary washes have been used thereon without very satisfactory results. For instance, the concrete surface is sometimes treated with a preliminary wash of dilute hydrochloric acid for the purpose of removing the free lime and other alkali. This, however, has a number of disadvantages since it destroys the bonding of the cement, thereby weakening the surface layer and causing scaling or chipping of the cement and aggregate. Other strong acids, such as oxalic acid have also been tried without satisfactory results. Washes of various metallic salts, such as sulfate of zinc, alum, and the like, have also been tried, but these do not prove satisfactory in use because of double decomposition with the components of the cement, destroying the bonding of the cement and forming loose and pulverulent substances. Solutions of ammonium carbonate have been tried for the purpose of converting the lime into calcium carbonate, and though these solutions are fairly satisfactory yet they are expensive and the incident manipulation is also expensive. Furthermore, solutions of ammonium carbonate and of the other bodies stated leave the surface of the concrete in a moist condition so that it must be dried before a paint coating can be applied. This requires considerable time and consequently delays the painting operation.

It is the object of the present invention to treat a concrete surface preliminarily with a composition which will at once form a varnish coating thereon and neutralize the superficial alkalinity of the concrete by combining therewith without production of crumbling substances or the disintegration of the bonding cement in such surface. For this purpose the concrete surface is first treated with a wash comprising the free fatty acids of the drying oils, such as linoleic acid from linseed oil. Linoleic acid though capable of neutralizing the alkalinity of lime, potash and soda, is not sufficiently strong to destroy the set cement. Set cement contains considerable lime in its body and it is desirable not to use an acid strong enough to affect such body. Linoleic acid will combine with the alkali in the surface of the concrete without penetrating farther and destroying the lime in the bonding cement body, therein differing from the strong water-soluble acids, such as hydrochloric and oxalic. In so combining with the surface lime of a granule of set cement it forms a good cementing body, calcium linoleate which keys directly to such granule. The film thus formed upon the surface of the granule, unites directly and readily with any ordinary oil varnish being like in nature thereto. With a concrete surface treated with linoleic acid and then painted with an ordinary oil paint the linoleate of lime may be said to be a linking member between the concrete and the body of the paint.

While the fatty acids of the drying oils than linseed oil may be employed, in practice I prefer to use the fatty acid of linseed oil. This fatty acid may usefully be incorporated with more or less of the oil from which it was derived, or with another drying oil. For example, in painting a concrete structure I find it useful to prime the surface preliminarily with a composition consisting of 1 part of the free fatty acids derived from linseed oil, 1 part of linseed oil itself and 1 part of Chinese wood or tung oil. A composition of this character is sufficiently acid to neutralize all the alkalinity likely to occur in ordinary good quality concrete while it contains sufficient drying oil to act as varnish coating. In use, the free linoleic and other acids in the composition neutralize the free alkali, whether lime, potash, or soda, forming the corresponding varnish like lineleate while the drying oil adheres to the treated surface, these combinations of linoleic acid with lime and the like have drying properties similar to those of linseed oil. Any excess of free fatty acid over and above that required to combine with the superficial alkali remains dissolved in the drying oil vehicle without materially injuring its setting qualities. Similar results may be obtained by treating the surface with a primer consisting of 1 part of the free fatty acid from linseed oil and 1 part of linseed oil. Since this composition contains a greater proportion of free acid than that just stated, it is better adapted for treating concrete containing a large proportion of free alkali. Gum thus, or "crude gum turpentine" may be admixed with either of the compositions stated. The resinic acids of the gum thus, though not so efficient *per se*, have similar neutralizing effect in connection with linoleic acid on superficial alkalinity. A good composition for the present purposes comprising gum thus and of quite acid nature may be made by mixing 1 part of free fatty acid from linseed oil with 1 part of wood oil and with 1 part of gum thus. These primary coatings are applied to the surface of the dry concrete as a thin coating or wash, and after drying, ordinary paint may be applied to the primed surface without danger of action on the paint coating. The primary coating acts to separate the concrete from the paint proper.

The compounds formed with lime by the fatty acid from linseed oil are insoluble in water and have drying and cementing properties. The free fatty acid containing no glycerin, in the formation of calcium linoleate no glycerin is set free and the primer coating does not develop hygroscopic properties. The free acid of the primer coating neutralizing the free lime of the concrete, there is no lime left to injure the glycerids either of the primer coating or of linseed or other unsaponified drying oils subsequently applied. Ordinary paints adhere well to particles of cement or concrete which have been coated with calcium linoleate produced in the described action.

The free fatty acids required for making the primer coating under the present invention can be produced by saponifying linseed oil or other drying oil by protracted boiling with a solution of caustic soda, and then adding sulfuric acid until the solution is faintly acid, or until the total alkali of the saponified mass has been converted into sodium sulfate. The composition is warmed for a time until the free fatty acid separates as a clear oil and this is then drawn off, leaving the glycerin in the aqueous layer. The linseed oil fatty acid may then be dried by means of the usual drying agents or it may be heated gradually up to 220° F. to remove moisture. It is then ready to be mixed with the other oils if these oils are to be employed in the cement primer.

While it is possible to use the fatty free acid alone as a priming coat, on account of its somewhat greater cost as compared with linseed oil and the like, I prefer to make mixtures of the free fatty acids with suitable drying oils, as this not only reduces the expense but also gives a more quickly drying priming coat. The superficial alkalinity of good concrete is not sufficiently great, as a rule, to necessitate the use of a pure fatty acid. A composition which contains a third or so of free fatty acid is, as a rule, sufficiently acid for the present purposes. The action of driers such as manganese borate or lead oxid on these compositions in accelerating drying is also more pronounced when linseed oil or other oil is present in addition to free linoleic acid.

The compositions above mentioned as priming materials may also be used directly as paints for concrete by the incorporation of suitable pigments, furnishing the whole body of the coating in lieu being used merely as a primer. Ordinary zinc oxid and white lead being of a highly basic character are not so well adapted for introduction into the oily composition containing a large proportion of free fatty acids as are the more inert pigments such as zinc sulfid, lithopone, barytes, whiting, gypsum, silex, magnesium silicate and the like, and I therefore prefer to employ the inert pigments in preference to those of a basic character. Suitable coloring materials may of course be added to the cement paint formed by the addition of the above-mentioned filling or extending materials, care being used to select preferably those pigments which are unaffected by free fatty acid. As the compositions used under the present invention are somewhat more expensive than ordinary linseed oil paints, however, it is preferable to use them merely as the primer coating, using ordinary paint for the body of the coating. However, where it is desired to use these compositions to furnish the whole body of the coating, a good composition can be made of 7 parts of free fatty acid from linseed oil, 3 parts wood oil, 8 parts linseed oil, 2 parts rosin, 15 parts lithopone and 4 parts gypsum. In lieu of rosin, which serves as a hardening agent, in the above mixture, resinous material such as gum kauri, Manila copal and the like may be employed, or the rosin or resinous material may be entirely omitted. For quick drying compositions, the relative amount of oil may be reduced and the proportion of the resinous bodies increased. As stated, the resins contain free acids which may serve adjunctively with the free linoleic acid. Another composition consists of free fatty acids from linseed oil 7 parts, 10 parts gum kauri, 3 parts rosin, 6 parts benzin, 3 parts turpentine, and 20 parts zinc sulfid.

In some cases, especially in treating concrete which is slightly damp, it is better to introduce into the paint a small amount of water as this aids in the blending action. For this purpose water may be introduced suitably thickened by some gelatinous material as for example, Irish moss or gelatin or emulsified in any other way into the composition. A small amount of linseed oil soap sometimes aids in the emulsification. This may be generated in the paint itself by the use of water containing a small amount of carbonate of soda or caustic soda, thereby generating the linseed oil soap in the mixture. Care should be taken to not use such a quantity of alkali that the free fatty acid is neutralized since of course for the present purposes a substantial amount of free fatty acid must be present in the composition in order to secure a permanent and adhering coating. The addition of water to the cement paint is beneficial also in those cases where the cement is exposed to the sun's rays or to strong heat, for under such conditions, the moisture which is always present to a greater or less extent in the concrete, exerts an expansive action causing paint which is non-porous to blister badly. The addition of water gives a certain amount of porosity to the paint film thereby preventing such blistering.

While the free fatty acids of linseed oil have been described herein as best adapted for the present purposes, I do not wish to indicate that this fatty acid material alone is serviceable as the fatty acids obtained from other drying oils or from nondrying or from slow drying oils, are more or less serviceable, particularly where the composition is used as a priming coating. The acids from linseed oil are, however, the best since they are permanent in storage and possess drying properties somewhat similar to those of the linseed oil and they blend readily with ordinary linseed oil in paint mixtures which is ordinarily an advantage as linseed oil is commonly used as the paint vehicle. As I have stated in Serial No. 638,518, entitled "Composition for priming and coating concrete," most of the resins used in the making of varnishes and paint oils contain a large percentage of free resin acids and esters which are readily saponified by boiling alcoholic potash but which are slowly saponified by the alkalis of cement. In neutralizing a concrete surface with an acid composition which also forms a water resisting coating, the speed of neutralization has to be considered. If the acid component acts rapidly, neutralization is effected before the coating has set and dried. If the action of the acid component is slow, neutralization and reaction may go on after the setting and drying of the composition, thus causing rupturing of the coating and its ultimate destruction. The resin acids differ from the fatty acids in this respect. They are slower in neutralizing activity than the fatty acids, so slow in fact, that a coating compound has opportunity to dry and harden before neutralizing reactions are under way and these subsequently progress to the detriment of the coating. The fats are bodies of synthetic origin and as glycerids form well characterized bodies. The resins are largely bodies resulting from condensation and are fluctuating in composition and the nature of their components is not at all well established at the present time. The copals which are so extensively used in varnish making, fluctuate very greatly. Manila copal, for example, may have an acid number of 135 and a saponification value of 185, while Angola copal will perhaps give an acid number of 60 and a saponification value of 135. Borneo copal will give an acid number of about 145 and a saponification value of 180. Amber contains about 30% resin acids and nearly 70% of saponifiable esters. Common rosin has an acid number of about 140 although this varies with different grades. It consists largely of abietic acid or its anhydrid. Sandarac has an acid number of about 150. The uncertain composition of resins make all these figures of indifferent value and the variations in ester value and acidity together with the further changes taking place in the fusing or melting of the hard gums or resins, preparatory to mixing with oils or thinners, leaves in doubt, always, the action of the resin acids and esters on the alkali of cement. The use therefore of the "short oil varnishes", that is varnishes high in saponifiable resin and low in oil for coating cement is only a makeshift at best. The fatty acids from ordinary fats, including such acids as stearic, palmitic and oleic, are more rapid in their neutralizing action and are more homogeneous in composition so that their reaction with cement alkali is more effective and decisive. The same is true of the fatty acids of drying oils such as linseed and tung or soy bean oil or of the slower drying oils such as cotton seed and corn oil. The fatty acids of the drying oils have the advantage that after neutralizing the superficial alkali, forming in the main a lime soap of a water insoluble character, drying sets in and a more resistant body is produced. The lime soaps of the resins are prone to hydrolysis while the same is true to some extent of the soaps of the non-drying oils. The drying oils are better adapted to resist the hydrolyzing action of moisture as their lime soaps formed in the cement by the action of their fatty acids on oxidation or drying do not exhibit the same hydrolyzable tendencies. It is of importance to have present in the composition a substantial proportion of free fatty acid with which may be incorporated resin acid. 20% or so of the free fatty acid suffices for ordinary cement or concrete. Small proportions of free fatty acids, say one per cent. or thereabout, which amount often is found in ordinary linseed or other drying oils of commerce, does not suffice for the purposes of the present invention. Furthermore it is desirable as stated to have the fatty acids in a non-anhydrous condition.

What I claim is:—

1. In a finish coat for cement, a composition comprising at least 10% of the free fatty acid of a drying oil and acid resin and thinning and extending materials.

2. In a finish coating for cement a composition comprising a substantial amount of the free fatty acids of a drying oil, an acid resin and thinning and extending materials.

In testimony whereof I have affixed my signature in presence of two witnesses.

CARLETON ELLIS.

Witnesses:
 NATHANIEL L. FOSTER,
 FRANCES I. NEWMAN.